(12) United States Patent
Chin et al.

(10) Patent No.: US 7,838,158 B2
(45) Date of Patent: Nov. 23, 2010

(54) SHEET ANODES BASED ON ZINC-ALUMINUM ALLOYS AND ZINC-AIR BATTERIES CONTAINING THE SAME

(75) Inventors: Tsung-Shune Chin, Hsinchu (TW); Chi-Jui Lan, Tucheng (TW); Pin-Hen Lin, Sinjhuang (TW)

(73) Assignee: National Tsing Hua University, Hsinchu (TW)

( * ) Notice: Subject to any disclaimer, the term of this patent is extended or adjusted under 35 U.S.C. 154(b) by 1346 days.

(21) Appl. No.: 11/168,322

(22) Filed: Jun. 29, 2005

(65) Prior Publication Data

US 2006/0003228 A1    Jan. 5, 2006

(30) Foreign Application Priority Data

Jun. 30, 2004    (TW) ............................... 93119246 A

(51) Int. Cl.
*H01M 4/42*    (2006.01)
*H01M 8/22*    (2006.01)

(52) U.S. Cl. ...................................... 429/406; 429/229

(58) Field of Classification Search .................... 429/27, 429/229, 406
See application file for complete search history.

(56) References Cited

U.S. PATENT DOCUMENTS 4,081,693 A * 3/1978 Stone .......................... 307/66

FOREIGN PATENT DOCUMENTS

JP            60084767 A * 5/1985

* cited by examiner

*Primary Examiner*—Tracy Dove

(57) ABSTRACT

The present invention provides a sheet anode based on modified zinc-aluminum alloys and Zinc-Air batteries containing the same. The sheet anode is consisted of $Zn_xAl_yM_z$, wherein M comprises an element selected from the group consisting of alkaline metal and alkaline earth metal, or its further combination with at least one of Mn, Si and Cu; x, y and z each represents the weight percent of Zn, Al and M, and x+y+z=100; 2<y<50; and 0.5<z<6. The present invention also provides a sheet anode prepared from scrapped aluminum alloys, scrapped magnesium alloys, or scrapped zinc alloys, and the said sheet anode can be further made to be porous before use by proper etching.

14 Claims, 9 Drawing Sheets

SHEET ANODES BASED ON ZINC-ALUMINUM ALLOYS AND ZINC-AIR BATTERIES CONTAINING THE SAME

This application claims the priority benefit of Taiwan Patent Application Serial Number 093119246 filed Jun. 30, 2004, the full disclosure of which is incorporated herein by reference.

BACKGROUND OF THE INVENTION

1. Field of the Invention

The invention relates to a new sheet anode, specifically to the sheet anode based on modified zinc-aluminum alloys and zinc-air batteries containing the same.

2. Description of the Related Art

Zinc-air batteries include a zinc anode, a separator, electrolyte, and an air cathode. The most commonly used electrolyte is concentrated potassium hydroxide (KOH). The theoretical specific energy and theoretical cell voltage are 1085 Wh/kg and 1650 mV, respectively. Low operating power and short cycle life were two major problems for zinc-air batteries. Great efforts have been made worldwide to develop better air cathodes and zinc anodes.

The efforts of research on Zn anode focused on the enhancement of cell capacity and cycle life of pure Zn, which being mainly made into electrolytic powders then blended with suitable binders and compacted into porous plates before use. The specific surface area of an electrode is an important parameter. A porous Zn anode performs higher utilization efficiency and lower anodic passivation than does a rolled Zn sheet anode. As for the binder for Zn powders, it is very common to use a gelling agent during compaction to fabricate a porous Zn anode. Othman et al. studied a new gelling agent. They used KOH-treated agar thin layer to improve the interfacial contacts. Rolled zinc sheet had been used as the anode at early stage of development the zinc-air batteries. However it was given up due to the inherently severe passivation during discharge. In this invention, the difficulty of using rolled zinc sheet is overcome by using two-phase-structured zinc alloys, which also serve to increase cell voltage and cell capacity.

SUMMARY OF THE INVENTION

The object of this invention is to provide sheet anodes, in a preferred composition of $Zn_xAl_yMg_z$ wherein x, y, z are in weight percent, and x+y+z=100 in the form of rolled sheets as the anode material to make the preparation of an anode more easier and overcome the abovementioned passivation problems. Batteries thus developed were aimed at applications in compact-sized 3C (computer, communication and Consumer electronics) products, and for powering the electric vehicles.

The $Zn_xAl_yMg_z$ alloy sheets of the present invention are designed not only for easier manufacturing and handling, but also for more sustainable in use under severe environments (eg., vibration of a vehicle) than those for conventional porous Zn electrodes made of compacted and bonded electrolytic Zn powder. Melting and rolling processes were designed to manufacture the anode sheets instead of electrolysis then compaction of Zn powders. It is more convenient to handle $Zn_xAl_yMg_z$ sheets rather than Zn powder compacts during mechanical re-charge. There is no need of an anode mesh (usually Ni) to get hold of the powder compacts hence space and weight privileges will be earned.

According to the present invention, the addition of Al was intended to result in, according to Zn—Al binary phase diagram, a two-phase structure in which the Al-rich phase also serves as the fuel as well. Among the disclosed alloying range, three examples of Zn—Al alloys were chosen from the Al—Zn binary phase diagram. Because Al reacts severer than does Zn in a concentrated alkaline solution, the Al-rich phase was designed to dissolve and discharge more quickly than do Zn-rich phase. The different reaction speeds will cause unbalance etching of the anodes and result in a self-generated much porous structure with a high surface area. At a larger discharge current, deeper penetrating channels will naturally appear during the discharge and dissolution processes.

However, although the addition of Al, improves the anode efficiency and specific cell capacity manifestly as disclosed in the examples, it also increases the self-discharge rate of the cell. The shelf life of a cell with Zn—Al alloy sheet anode will be shorter than a cell with conventional anode made of compacted Zn powder once the electrolyte is filled in. This is due to the more reactive Al-rich phase and the Galvanic corrosion effect therein between the Zn-rich and Al-rich phases. Therefore, a third element was incorporated into the Zn—Al binary alloys for turning the alloy systems into ternary alloys which could be denoted by $Zn_xAl_yM_z$. Element M represents an alkaline metal or alkaline earth metal, or its combination with an element selected from the group Mn, Si and Cu. Among them, x+y+z=100, 2<y<50, 0.5<z<6.

DETAILED DESCRIPTION OF THE INVENTION

The present invention proposes sheet anodes based on the modified zinc-aluminum alloys and zinc-air batteries containing the same. The alloys are denoted by $Zn_xAl_yM_z$. Element M represents an alkaline metal or alkaline earth metal, or its combination with an element selected from the group Mn, Si and Cu. Among them, x, y, z are in weight percent, x+y+z=100, and 2<y<50, 0.5<z<6.

It was noticed that a self-discharge rate will be too high if the amount of Al is larger than 50 wt % to hinder practical applications, but if the amount of Al less than 2 wt %, the beneficial effect of de-polarization and on capacity enhancement will be insignificant.

Further, if the amount of the third element (M) is larger than 6 wt %, it renders a very stable anode to react with alkaline electrolyte, thus no cell reaction could be proceeded. But if the amount of element M is less than 1 wt %, the effect on lowering self-discharge rate will be insignificant.

Element M includes at least one of Li, Na, K, Be, Mg, and Ca. Taking Mg as one example the alloy becomes $Zn_xAl_yMg_z$. It was found by this invention that the combination of M with at least one element selected from Mn, Si and Cu will further reduce the self-discharge rate.

It is preferred that the amount of Al is smaller than 40 wt % but larger than 10 wt %.

It is even more preferred that the amount of Al is smaller than 30 wt % but larger than 15 wt %.

It is preferred that the amount of Mg is smaller than 5 wt % but larger than 1 wt % is much better, while 4 wt % is the best.

In addition, element M may include a little unavoidable impurities, such as Fe, Cr, Ni and Ti; but the amount should be less than 0.5 wt %.

In case of requirement, preferential etching of the Al-rich phase in rolled alloy sheets before discharge to create surface porosity can be done by either conventional etching or Galvanic etching, respectively, using a KOH solution of pH 8.5~10, wherein Zn is electrochemically stable according to the Pourbaix diagram. In one embodiment, weight loss method is adopted to compare the etching rate of sheet anodes in this invention. For Galvanic etching, specimens are connected to a Pt electrode forming a Galvanic cell. Comparison in etching rate between Galvanic etching and conventional etching was made in Example 3.

The sheet anodes of the present invention can also be made of scrapped zinc alloy, scrapped aluminum alloys and scrapped magnesium alloys.

It is preferred that the scrapped zinc alloy composes of Zn and Al as the major constituents.

It is preferred that the scrapped aluminum alloys are chosen from at least one of Al—Mg, Al—Si, Al—Cu or Al—Mn alloys.

It is preferred that scrapped magnesium alloy is an Mg—Al binary alloy.

Finally, the invention is about the zinc-air batteries containing one sheet anode based on modified zinc-aluminum alloys by using concentrated alkaline solution as the electrolyte.

DETAILED DESCRIPTION OF THE PREFERRED EMBODIMENT

Details of experimental procedures and results are disclosed in the following preferred embodiments to facilitate understanding of what will be claimed for. It is by no means a limitation to the present invention.

Preparation of Sheet Anodes:

Binary alloy ingots with nominal compositions $Zn_{100-x}Al_x$ (x=6, 16.9 and 22.3 weight percent, respectively) and $Zn_x$-$Al_yMg_z$ wherein z=1~6 wt % were prepared by melting in an electrical furnace at 685° C. the mixtures of pure Zn (purity>99.98%), Al beads (purity>99.95%) and pure Mg (purity>99.9%). Anode sheets were prepared by rolling the alloy ingot using a conventional rolling mill. The final thickness of the sheets was controlled to within 0.28±0.03 mm. The sheets were annealed at 240° C. for 1~12 hours after rolling to remove residual stresses and to stabilize the two-phase structure. ICP-AES analysis was carried out to analyze the composition of the anode sheets.

Discharge tests of Cells:

Test cells, with interior size 42 mm×24 mm×6.09 mm, were assembled with a sheet-anode taken from those described above, 6.6 M KOH electrolyte, a separator made of non-woven cloth, and a commercially available air cathode. A BAT-750 charge/discharge equipment (Acutech Systems Co., Ltd., Taiwan) was used to perform discharge characterization at different constant currents and to monitor the OCV of the cells. The discharge currents applied were 100, 150 and 200 mA, respectively. During the cell tests, no forced convection of air was adopted. The specific cell capacity, in mAh g$^{-1}$, was calculated from the amperage, hours at end-point of discharge and the weight of the thin anode sheet.

EXAMPLE 1

Discharge Tests of Sheet Anodes Made of Zn—Al Binary Alloys

Figure 1:
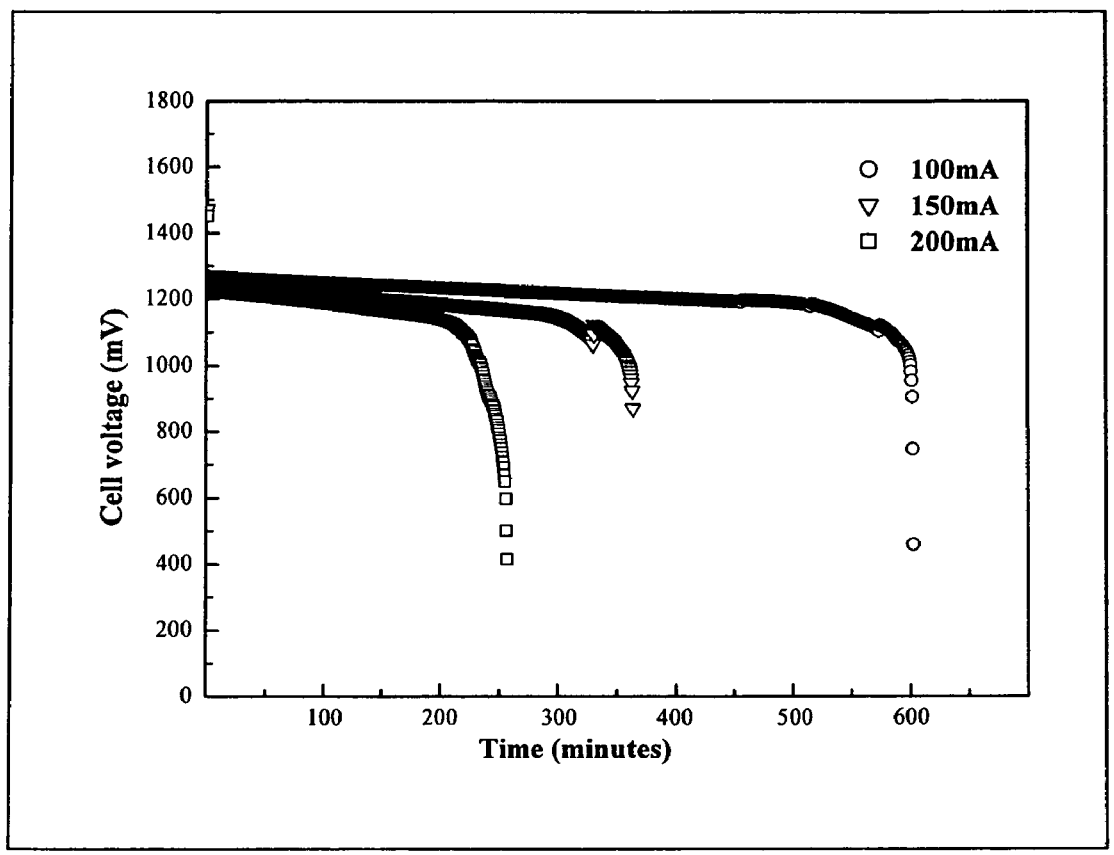
FIG. 1 shows discharge curves of a zinc-air battery with sheet anode of pure Zn.
Figure 2:
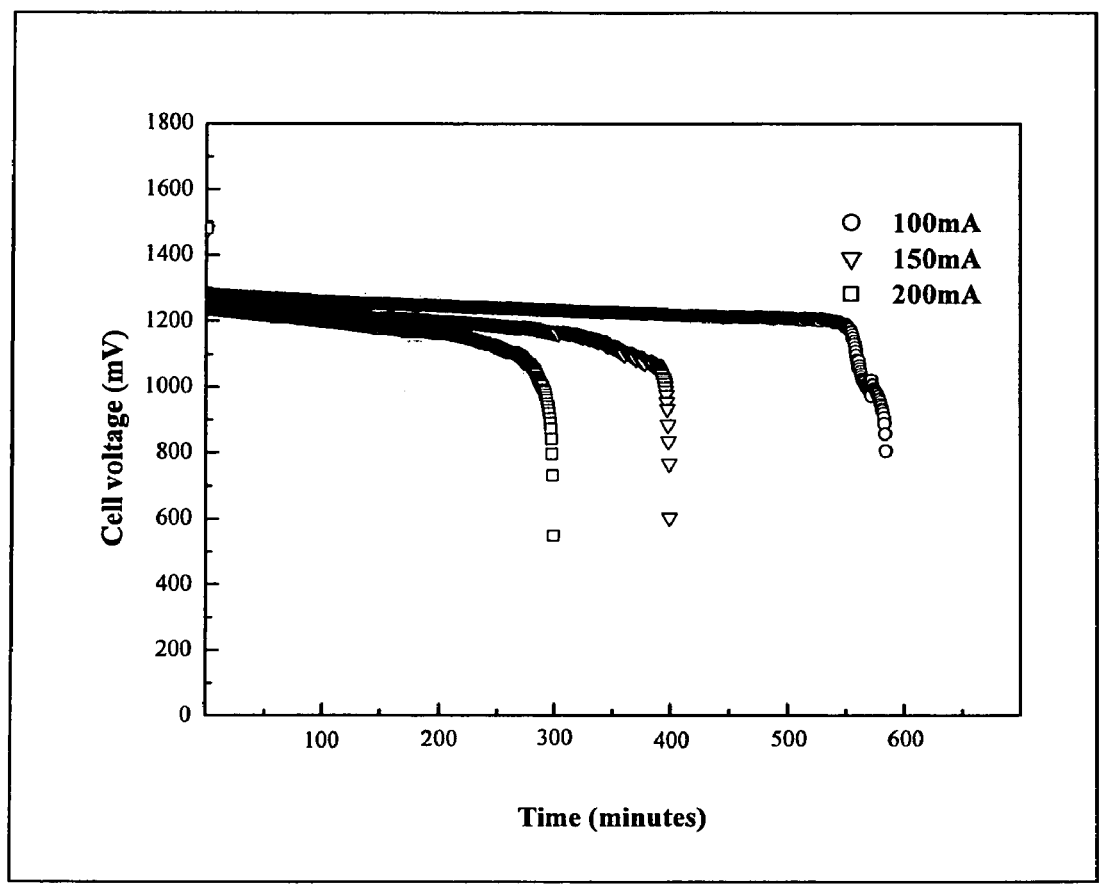
FIG. 2 shows discharge curves of a zinc-air battery with sheet anode of Zn-6 wt % Al alloy.
Figure 3:
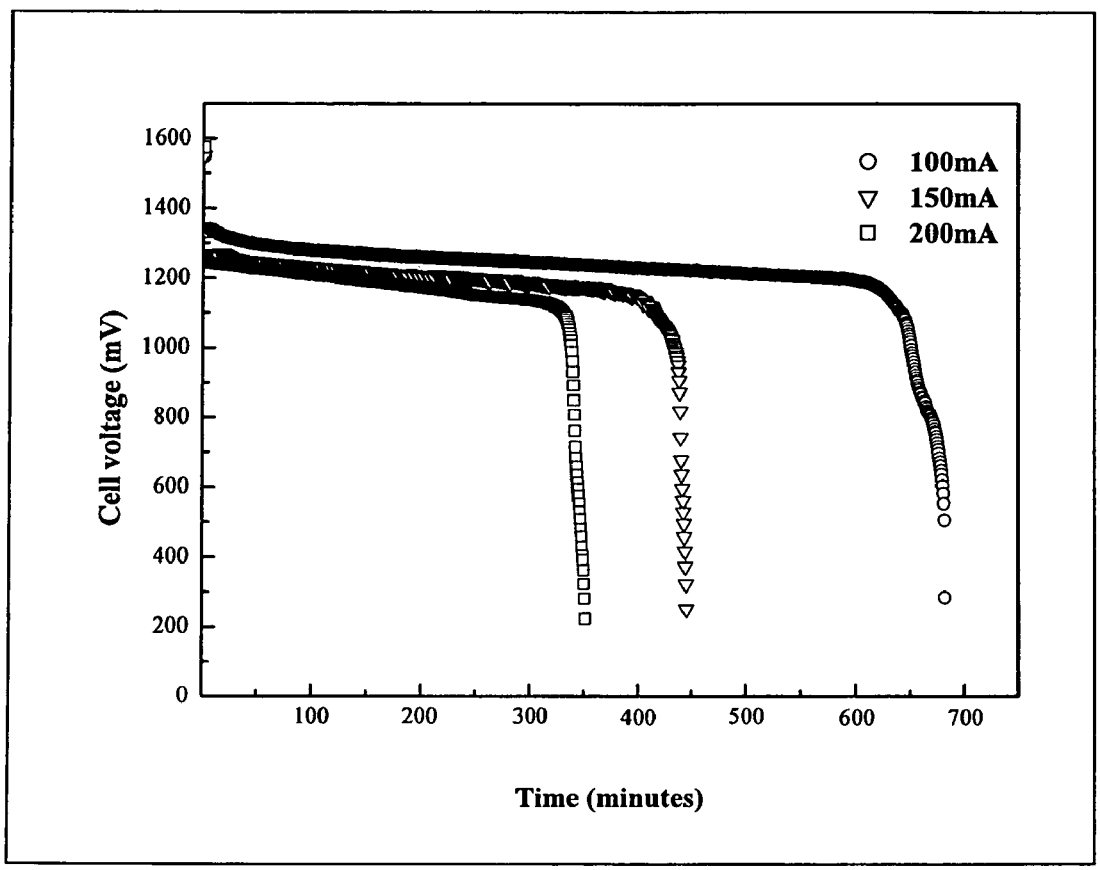
FIG. 3 shows discharge curves of a zinc-air battery with sheet anode of Zn-16.9 wt % Al alloy.
Figure 4:
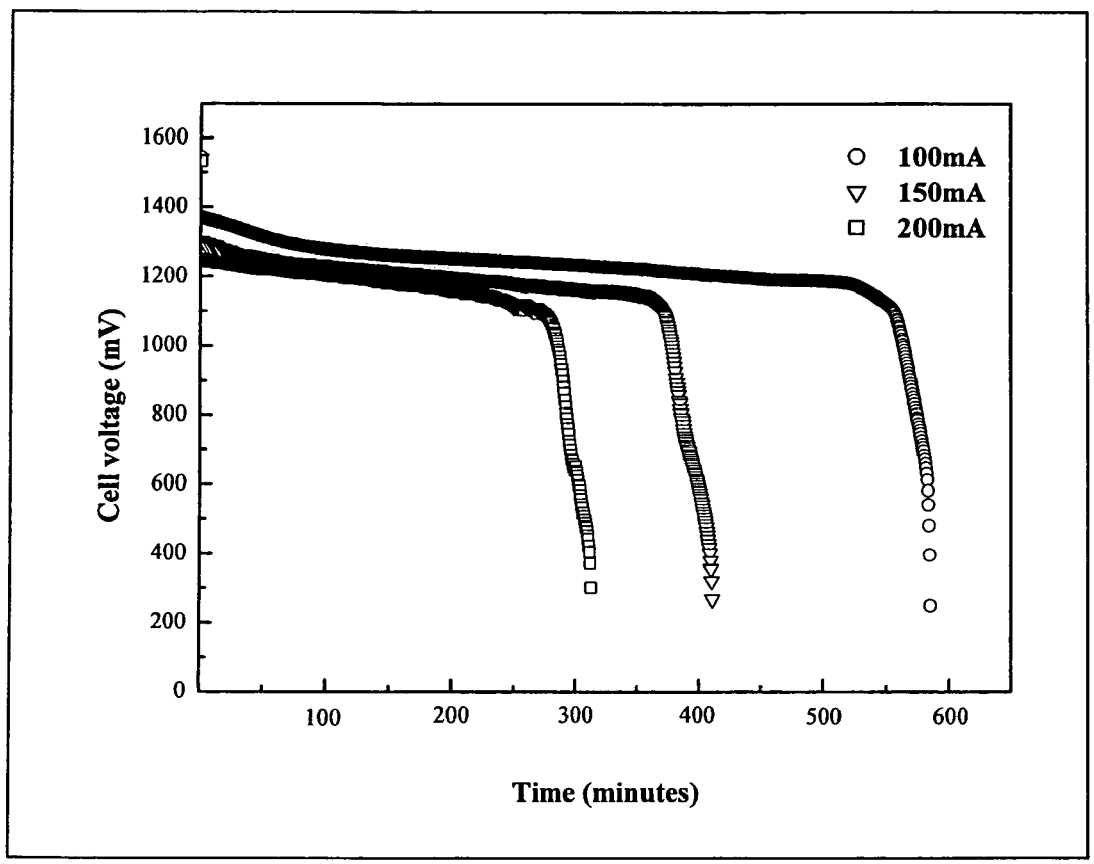
FIG. 4 shows discharge curves of a zinc-air battery with sheet anode of Zn-22.3 wt % Al alloy.
Figure 5:
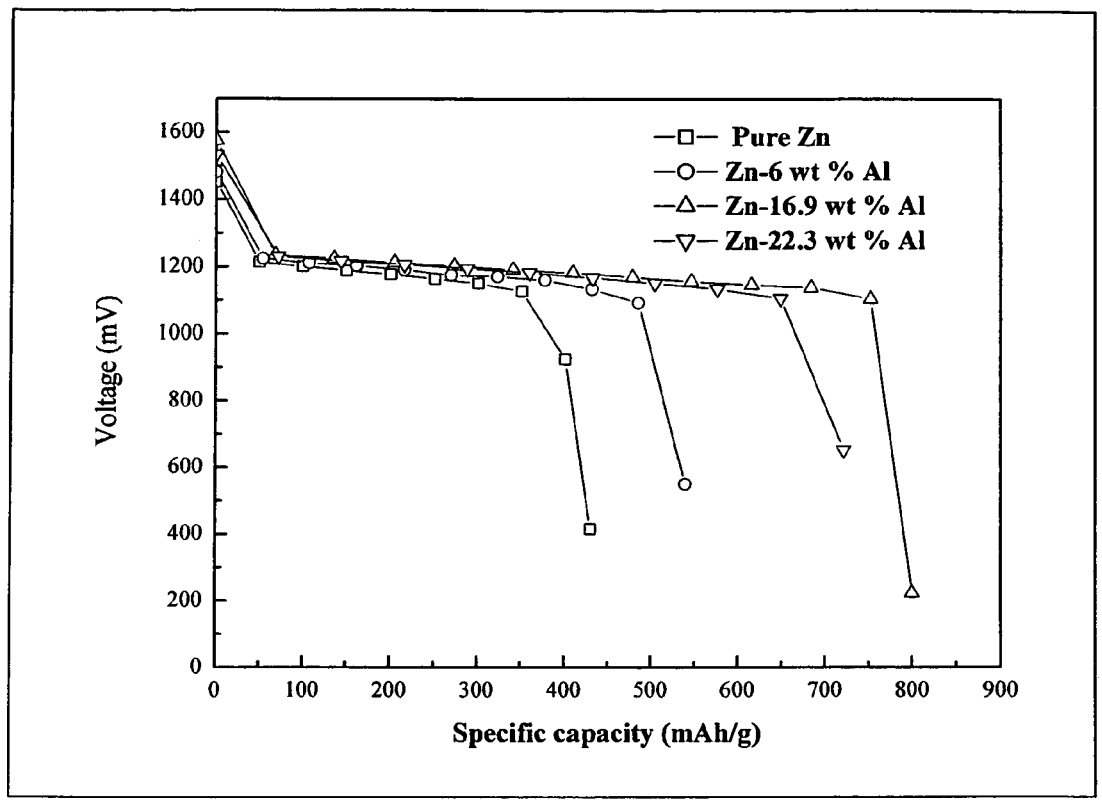
FIG. 5 shows the comparison between discharge performance (in specific capacity) of pure Zn and Zn—Al alloys under a constant current loading of 200 mA.

The discharge behaviors of the test cells assembled using the sheet-anodes of pure zinc and three Zn—Al alloys are typically shown in FIGS. 1~4. The resultant specific cell capacity (mAh g$^{-1}$) and OCV values are listed in Table 1. All the cells performed similar shape of discharge curves with a long flat plateau characteristic of alkaline batteries. For the discharge tests of sheet anode made of pure zinc, the specific cell capacity decreases with higher discharging currents. A 17% decrease in specific cell capacity occurs in cells of pure Zn anode when discharge current increases from 100 mA to 200 mA. This is resulted from the serious anodic passivation hence lower anode utilization of the rolled Zn electrode. The addition of Al not only raises OCV value but also increases the specific cell capacity. The cell with a sheet anode of Zn-16.9 wt % Al performed the highest OCV value of 1560 mV compared with 1460 mV of the cell with a pure Zn anode. The higher OCV value is attributed to higher oxidation potential of the Zn—Al alloys. And pure Al possesses a much higher theoretical electrochemical equivalence of 2980 mAh g$^{-1}$ comparing with that of Zn 820 mAh g$^{-1}$. The cell capacities of the test cells with Zn—Al anodes show much improved values compared with that of pure Zn anode due to the fact that the alloying element Al also serves as the fuel. The highest resultant specific cell capacity was 720-860 mAh g$^{-1}$ for test cells with the Zn—Al anodes. The comparison of discharge performance (in specific capacity) between pure Zn and Zn—Al alloys under the same discharge loading was shown in FIG. 5.

A closer examination on Table 1, one may surprisingly find that the resultant specific cell capacity of a cell with a sheet anode of Zn—Al alloys is in fact slightly increasing with higher current loadings from 100 mA to 200 mA. This is arisen from the two-phase structure of the Zn—Al sheets and the preferential etching of the Al-rich phase that keeps reacting with KOH first to create surface porosity, that in turn refreshes surface of the Zn-rich phase for a continued better discharge. In fact the two phases discharge alternatively and simultaneously. With increasing discharge current the specific surface area of the alloy anode becomes higher due to quicker penetration of the discharged Al-phase leading to higher specific cell capacity.

Because Al reacts severer than does Zn in a concentrated alkaline solution, the Al-rich phase dissolves and discharges more quickly than do Zn-rich phase. The different reaction speeds caused un-balance etching of the anodes and resulted in a self-generated structure that is much porous with a very high surface area. At a larger discharge current, deeper penetrating channels will naturally appear during the discharge and dissolution processes. Thus higher cell utilization was achieved.

TABLE 1

| Composition | OCV (mV) | Specific cell capacity (mAh g$^{-1}$) under constant current discharge | | |
|---|---|---|---|---|
| | | 100 mA | 150 mA | 200 mA |
| Pure Zn | 1460 | 520 | 480 | 430 |
| Zn-6 wt % Al | 1480 | 530 | 535 | 540 |
| Zn-16.9 wt % Al | 1560 | 770 | 780 | 800 |
| Zn-22.3 wt % Al | 1540 | 720 | 725 | 750 |

EXAMPLE 2

Self-Discharge Rate of ZnAlMg Alloy

In this example, 1~4 wt % Mg was added into the Zn-16.9 wt % Al alloy, melting to form ZnAlMg ternary alloys. The melt was cast into cylindrical rods 7.5 mm in diameter. The cylindrical rods were cut into disk specimens with about 10 mm in thickness. Thus four alloys denoted by $Zn_{82.3}Al_{16.7}Mg_1$, $Zn_{81.5}Al_{16.6}Mg_{1.9}$, $Zn_{80.7}Al_{16.4}Mg_{2.9}$ and $Zn_{79.9}Al_{16.3}Mg_{3.8}$ were obtained.

The four ZnAlMg disks were immersed into a 6.5M KOH solution, for a predetermined time period. Weight loss was calculated to determine the self-discharge rate.

Figure 6:
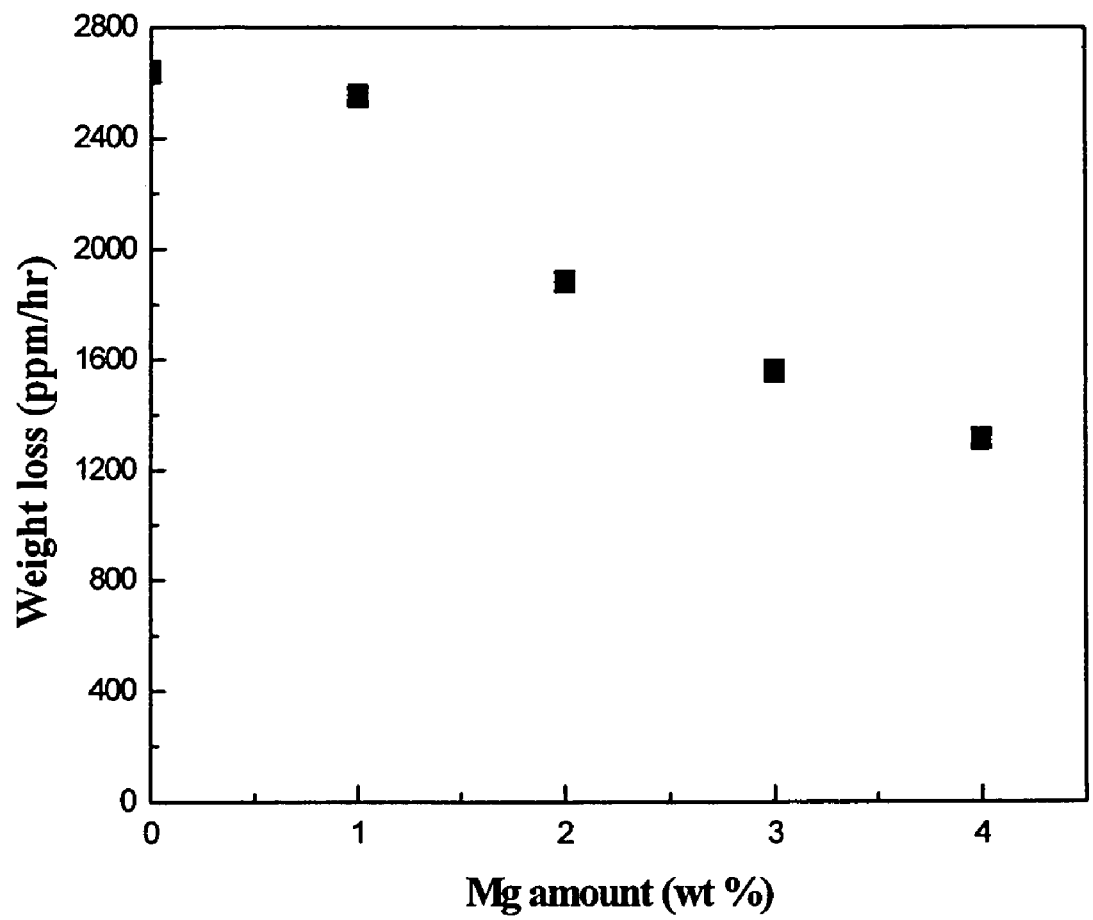
FIG. 6 shows the effect of different amounts of Mg addition on the deduction of self-discharge rate.

According to FIG. 6, the addition of Mg could significantly decrease the self-discharge rate, especially with 4 wt % addition (analysis: $Zn_{79.9}Al_{16.3}Mg_{3.8}$). Further, the inventors made trials on more Mg additions. When the amount of Mg was more than 4 wt %, the self-discharge rate was significantly decreased, but the alloys were too brittle to roll.

In addition, the inventors also took trials to add an element selected from Si, Mn and Cu into ternary Zn—Al—Mg alloy, it was found that the self-discharge rate decreases by 50, 100, 250 ppm/h, respectively. It could be resulted from the reason that the addition of an element selected from Si, Mn and Cu could decrease the solubility of zincate in alkaline electrolyte.

EXAMPLE 3

Galvanic Etching of ZnAlMg Ternary Alloy Plates

Weight Loss Measurement of Galvanic Etching Anode Plate $Zn_{79.9}Al_{16.3}Mg_{3.8}$ disk was connected to a Pt sheet and immersed into a KOH electrolyte of pH 8.5~10 to form a Galvanic cell. Weight loss method was used to indicate the corrosion rate, that is determined according to the equation belowed.

$$\text{Weight loss ratio} = \frac{\text{weight decrease after etching}}{\text{intial weight of anode plate}}$$

Figure 7:
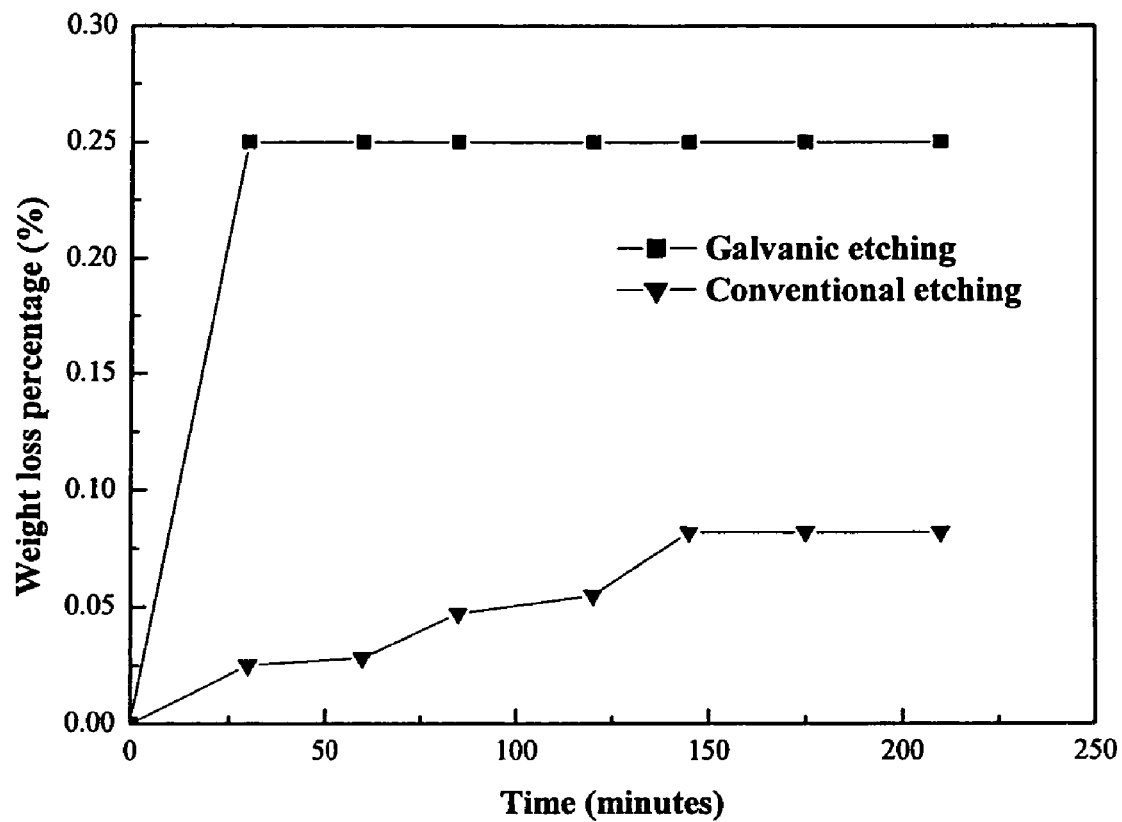
FIG. 7 is the comparison between Galvanic etching and conventional etching.
Figure 8:
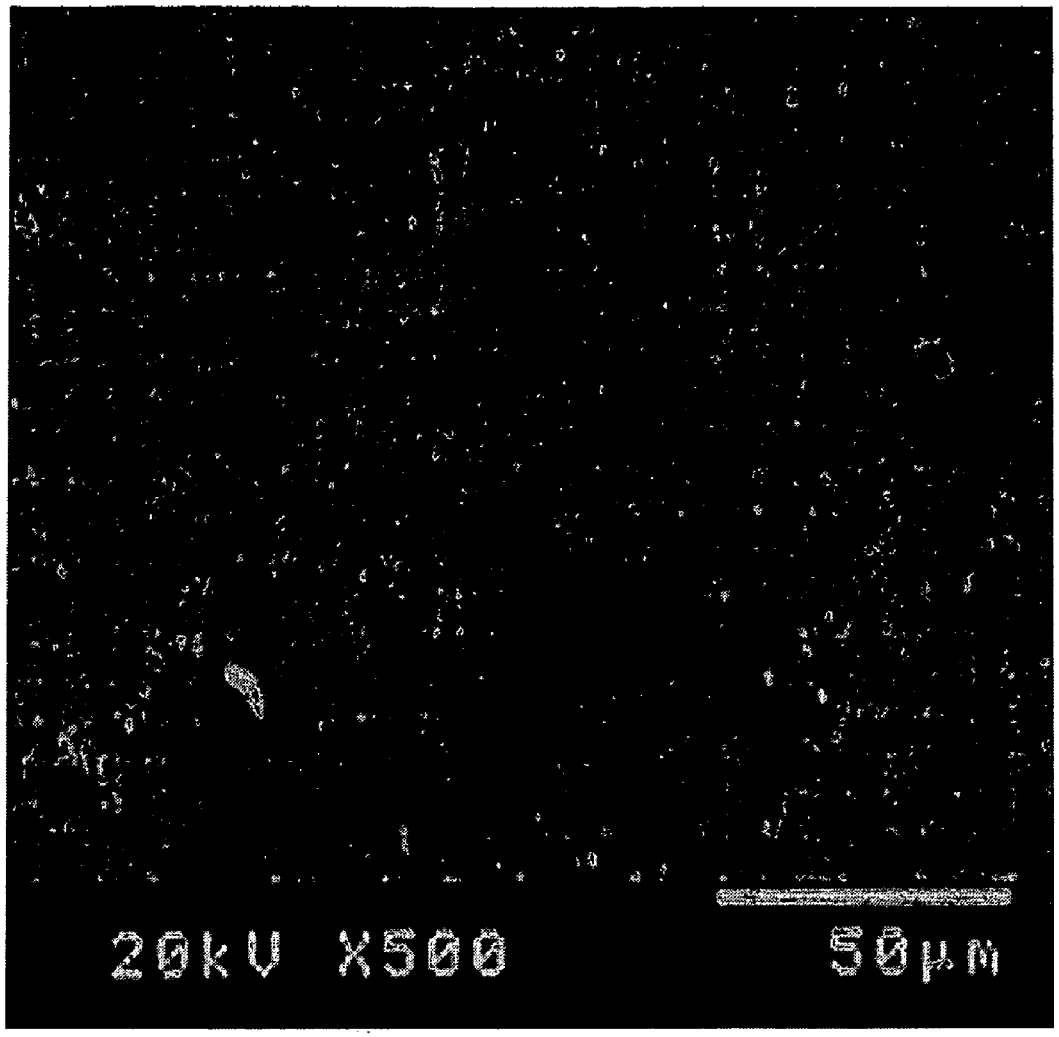
FIG. 8 is a typical microstructure of post-Galvanic etched anode plate.

The results are shown in FIG. 7. The surface morphology of post-Galvanic etching anode plate was analyzed by SEM, as shown in FIG. 8.

From FIG. 7, only about 30 minutes was needed to reach the maximum degree of digest (weight loss ratio equal to 0.25%) for ternary $Zn_{79.9}Al_{16.3}Mg_{3.8}$ alloy etched by Galvanic etching. FIG. 8 shows the metallurgical microstructure of etched $Zn_{79.9}Al_{16.3}Mg_{3.8}$ anode, being full of abundant etched pores, which serve as channels for the electrolyte to flow in. Self-generated porosity allows penetration of electrolyte deep into anode surface to result in better utilization and hence higher specific cell capacity. This is arisen from the two-phase structure and the preferential etching of the Al-rich phase that keeps reacting with KOH first to create surface porosity, which in turn refreshes surface of Zn-rich phase for a continued better discharge. In fact the two phases discharge alternatively and simultaneously. With increasing discharge current the specific surface area of the alloy anode becomes higher due to quicker penetration of the discharged Al-phase leading to higher specific cell capacity.

At a larger discharge current, deeper penetrating channels will naturally appear during the discharge and dissolution processes. Thus lowered passivation and higher utilization were achieved.

EXAMPLE 4

Methods to Prepare Sheet Anodes of ZnAlMg from Scrapped Alloys

Preparation of Sheet Anodes:

ICP-AES or EDS was used to determine chemical composition of the washed and degreased scrapped alloy. The scrapped alloys used were Zn—Al and Al—Mg from die-casting industries containing minor amount of impurities, mainly of Fe, Cr, Ni and Ti. An 81Zn-16Al-3Mg alloy was prepared from the scraps and resulting in the composition of 80.7Zn-16.4Al-2.9Mg (by weight) with trace amount of impurities. The other preparation procedures, anode plate surface area and thickness was the same with previous example. But it should be noticed that in order to reduce the amount of inevitable impurity, it was more suitable to choose low impurity scrapped alloys.

The amount of each impurity (Fe, Ni, Cr, Ti) should be less than 0.2 wt % and the total amount of impurities should be less than 0.5 wt %.

Figure 9:
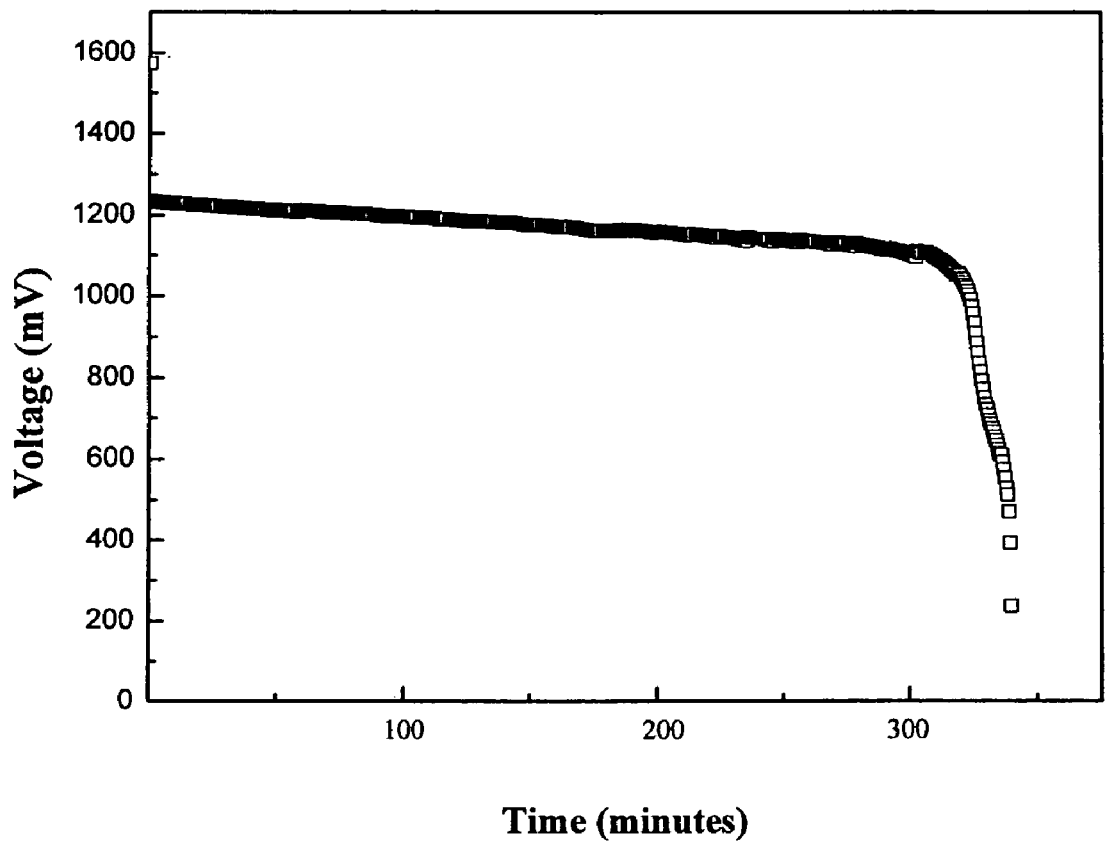
FIG. 9 shows the discharge curve of a zinc-air battery with sheet anode of $Zn_{80.7}Al_{16.4}Mg_{2.9}$ which being made of scrapped alloys.

Discharge Tests of Sheet Anodes:

The same procedures were used to discharge testing the sheet anode made of scrapped alloys at a constant current 200 mA, the results are shown in FIG. 9.

From FIG. 9, the OCV value is 1556 mV and the capacity is about 720 mAh g$^{-1}$. It was found that sheet anode from scrapped alloys performed well.

To conclude the invention, a sheet anode made of ternary $Zn_xAl_yM_z$ alloys based on modified Zn—Al alloys was disclosed. Because Al reacts severer than does Zn in a concentrated alkaline solution, a self-generated much porous structure with a high surface area was formed after immersion. Deeper penetrating channels will naturally appear during the discharge and dissolution processes, thus lowered passivation and higher utilization were achieved. On the other hand, the addition of a third element (M, being an alkaline or alkaline earth element such as Mg or its combination with another element selected from the group of elements Si, Cu, Mn) reduces the self corrosion rate because they possess high stability under alkaline environment. Thus the proposed sheet anodes possess advantages in good electrochemical property, such as higher cell voltage, larger cell capacity and easy manufacture procedures. In addition, the proposed anode plate could also be made from scrapped alloys, thus facilitate the request of cost-down and recycle of resources.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A sheet anode for zinc-air batteries comprising:
zinc-aluminum alloys represented by $Zn_xAl_yM_z$;
wherein M comprises one of an alkaline element or an alkaline-earth element, and wherein M further includes an element selected from one of Mn, Si or Cu, wherein x, y, z are weight percentages, and $x+y+z=100$, $2<y<50$, and $0.2<z<6$.

2. The sheet anode as claimed in claim 1, wherein M includes magnesium.

3. The sheet anode as claimed in claim 1, wherein $10<y<35$.

4. The sheet anode as claimed in claim 1, wherein $1<z<5$.

5. The sheet anode as claimed in claim 4, wherein $2 \leqq z \leqq 4$.

6. The sheet anode as claimed in claim 1, wherein M further includes minor amount of impurity elements, Fe, Cr, Ni, or Ti.

7. The sheet anode as claimed in claim 6, wherein the total amount of impurity is less than 0.5% total weight.

8. The sheet anode as claimed in claim 1, wherein the sheet anode includes an inner surface, an outer surface, ands a plurality of channels extending from the outer surface into the inner surface.

9. The sheet anode as claimed in claim 8, wherein the plurality of channels is generated by pre-digestion of the sheet anode which is connected with a noble metal and both immersing into an alkaline solution of Ph 8.5 to 10.

10. The sheet anode as claimed in claim 1, wherein the alloy is prepared from scrapped zinc, aluminum, and magnesium metals.

11. The claim as claimed in claim 10, wherein the scrapped zinc metals are Zn—Al alloys.

12. The claim as claimed in claim 10, wherein the scrapped aluminum metals are selected from the group consisting of Al—Zn, Al—Mg, Al—Si, Al—Cu, Al—Mn alloys and mixtures thereof.

13. The claim as claimed in claim 10, wherein the scrapped magnesium metals are selected from the group consisting of Mg—Al and Mg—Zn alloys and mixtures thereof.

14. A zinc-air battery includes a sheet anode, as claimed in claim 1.

* * * * *